US 11,404,984 B2

(12) United States Patent
Gizinski et al.

(10) Patent No.: US 11,404,984 B2
(45) Date of Patent: Aug. 2, 2022

(54) PARAMETER LEARNING FOR PERMANENT MAGNET SYNCHRONOUS MOTOR DRIVES

(71) Applicant: STEERING SOLUTIONS IP HOLDING CORPORATION, Saginaw, MI (US)

(72) Inventors: Nicholas E. Gizinski, Essexville, MI (US); Prerit Pramod, Saginaw, MI (US); Julie A. Kleinau, Bay City, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 568 days.

(21) Appl. No.: 16/013,399

(22) Filed: Jun. 20, 2018

(65) Prior Publication Data

US 2019/0393818 A1 Dec. 26, 2019

(51) Int. Cl.
*H02P 21/14* (2016.01)
*B62D 5/04* (2006.01)

(52) U.S. Cl.
CPC ............ *H02P 21/14* (2013.01); *B62D 5/0496* (2013.01); *H02P 2207/05* (2013.01)

(58) Field of Classification Search
CPC .... H02P 21/14; H02P 2207/05; B62D 5/0496
See application file for complete search history.

(56) References Cited

U.S. PATENT DOCUMENTS

| 6,081,093 | A | * | 6/2000 | Oguro | H02P 21/04 |
| | | | | | 318/801 |
| 7,294,988 | B2 | * | 11/2007 | Ajima | B60K 6/26 |
| | | | | | 318/712 |
| 8,474,570 | B2 | * | 7/2013 | Yanai | B62D 5/046 |
| | | | | | 180/443 |
| 8,786,230 | B2 | * | 7/2014 | Lee | H02P 6/18 |
| | | | | | 318/400.32 |
| 9,059,653 | B2 | * | 6/2015 | Shimada | H02P 6/183 |
| 9,575,127 | B2 | * | 2/2017 | Kezobo | B62D 5/0487 |
| 9,893,665 | B2 | * | 2/2018 | Yang | H02P 6/18 |
| 9,929,683 | B2 | * | 3/2018 | Sonoda | H02P 6/18 |
| 9,948,224 | B1 | * | 4/2018 | Huh | H02P 21/24 |
| 2017/0126153 | A1 | * | 5/2017 | Lepka | H02P 6/18 |
| 2018/0191285 | A1 | * | 7/2018 | Shigeta | H02P 21/22 |
| 2018/0257701 | A1 | * | 9/2018 | Tsuchimoto | B62D 5/0487 |

* cited by examiner

*Primary Examiner* — Jacob D Knutson
*Assistant Examiner* — Michael R Stabley
(74) *Attorney, Agent, or Firm* — Dickinson Wright PLLC

(57) ABSTRACT

Technical solutions are described for estimating machine parameters of a permanent magnet synchronous motor (PMSM) drive. An example method includes determining a region for estimating a machine parameter based on a motor velocity value and a motor current value. The method further includes, in response to the motor velocity value and the motor current value being in the region, estimating an error in estimated voltage command, and estimating the machine parameter using the error in estimated voltage command.

11 Claims, 6 Drawing Sheets

PARAMETER LEARNING FOR PERMANENT MAGNET SYNCHRONOUS MOTOR DRIVES

BACKGROUND

The present application generally relates to permanent magnet synchronous motor (PMSM) drives, and more particularly to those used in systems like electric power steering (EPS) systems.

Typically, motion control systems, such as an EPS, utilize electric drive systems to generate torque. For example, in case of the EPS, the electric drive is used to provide assist to a driver for steering a vehicle. In one or more examples, electric drive systems employ torque controlled PMSMs for providing the assist torque to the driver. Torque control of PMSMs is performed indirectly by regulating motor currents. The current control of motor currents is performed using a feedback control architecture with measured currents in the synchronously rotating reference frame utilizing the Field Oriented Control (FOC) theory. Feedback control in general has good steady-state tracking performance, dynamic response, high bandwidth and satisfactory disturbance rejection, and therefore, feedback current control is the most widely adopted technique in industry to control multi-phase AC machines.

Machine parameter estimates, such as back-EMF constant and motor circuit resistance, are utilized for determining the optimal current commands given a torque command, a machine speed, and a DC link voltage. Further, in several cases, the current regulator gains are scheduled as a direct function of estimated machine parameters to obtain satisfactory dynamic response characteristics of the motor torque and current control system. Machine parameters are also used within the motor control system for several other functions including signal observers, stability enhancement functions etc. Machine parameters vary widely throughout the operating region of the PMSM drive system as well as over the life of EPS system.

SUMMARY

Technical solutions are described for estimating machine parameters of a permanent magnet synchronous motor (PMSM) drive. An example method includes determining a region for estimating a machine parameter based on a motor velocity value and a motor current value. The method further includes, in response to the motor velocity value and the motor current value being in the region, estimating an error in estimated voltage command, and estimating the machine parameter using the error in estimated voltage command.

According to one or more embodiments a system includes a motor, a motor control system operating the motor using feedback control, and a machine parameter learning system that estimates a machine parameter of the motor control system. The estimation of the machine parameter includes determining a region for estimating a machine parameter based on a motor velocity value and a motor current value. The estimation further includes, in response to the motor velocity value and the motor current value being in the region, estimating an error in estimated voltage command, and estimating the machine parameter using the error in the estimated voltage command.

According to one or more embodiments, a steering system includes a permanent magnet synchronous motor (PMSM) drive, and a current command generator that generates a motor current command for the PMSM drive corresponding to an input torque command. The steering system further includes a parameter learning system that estimates a machine parameter of the PMSM drive. The estimation of the machine parameter includes determining a region for estimating a machine parameter based on a motor velocity value and a motor current value. The estimation further includes, in response to the motor velocity value and the motor current value being in the region, estimating an error in estimated voltage command, and estimating the machine parameter using the error in the estimated voltage command.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

As used herein the terms module and sub-module refer to one or more processing circuits such as an application specific integrated circuit (ASIC), an electronic circuit, a processor (shared, dedicated, or group) and memory that executes one or more software or firmware programs, a combinational logic circuit, and/or other suitable components that provide the described functionality. As can be appreciated, the sub-modules described below can be combined and/or further partitioned.

It should be noted that the various technical features described herein facilitate improvements to motor control systems. The description herein uses an electric power steering system (EPS) as an example that uses a motor control system, which is improved using and/or implementing the various technical features described herein. However, the technical solutions described herein are not limited to electric power steering systems, rather are applicable in motor control systems used in any other system, such as an industrial motor, a biomechanical device, an automated drive assist system, or any other electric machine that uses a motor control system.

Figure 1:
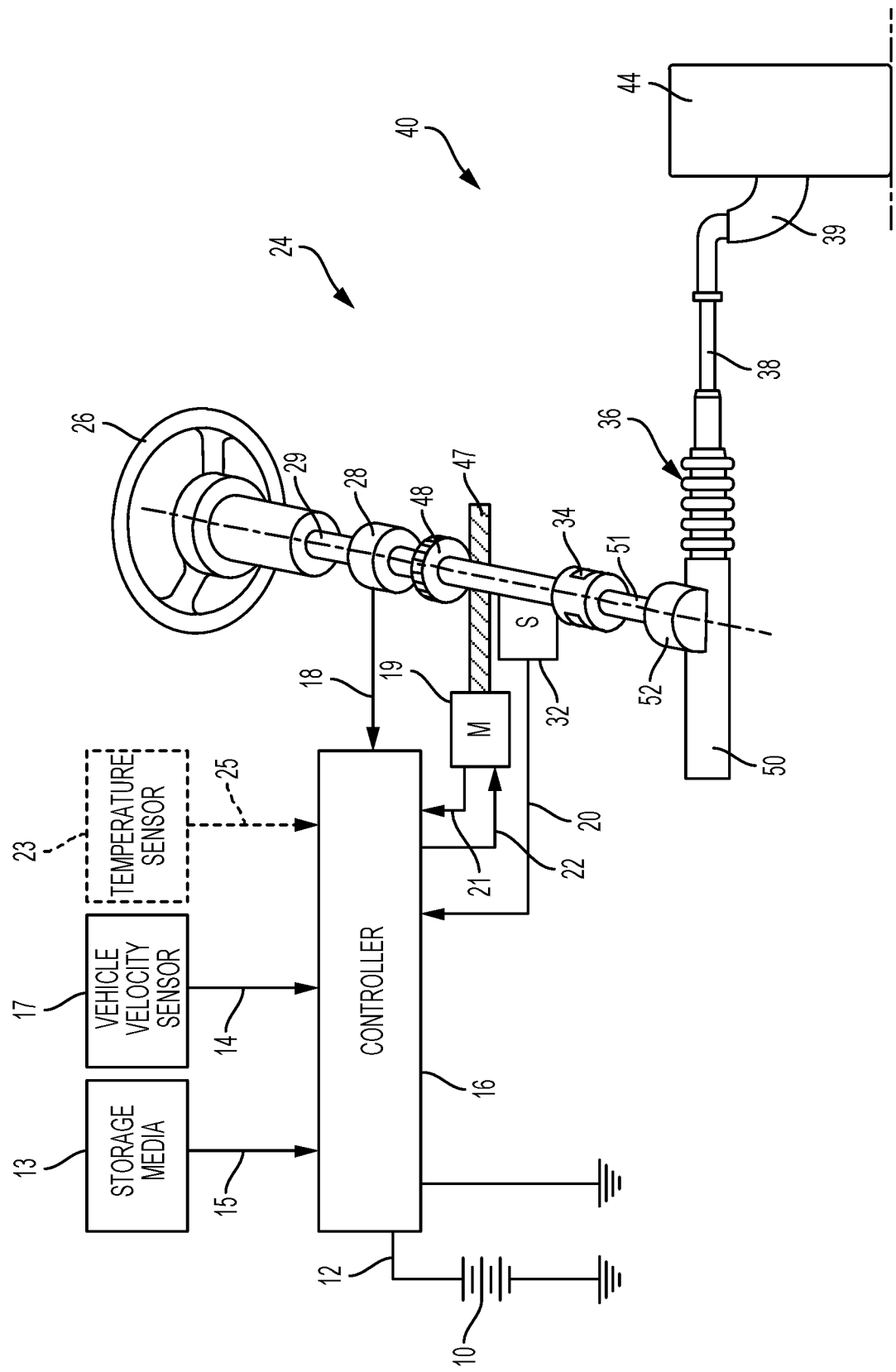
FIG. 1 is an exemplary embodiment of an electric power steering system according to one or more embodiments.

Referring now to the Figures, where the technical solutions will be described with reference to specific embodiments, without limiting same, FIG. 1 is an exemplary embodiment of an electric power steering system (EPS) 40 suitable for implementation of the disclosed embodiments. The steering mechanism 36 is a rack-and-pinion type system and includes a toothed rack (not shown) within housing 50 and a pinion gear (also not shown) located under gear housing 52. As the operator input, hereinafter denoted as a steering wheel 26 (e.g. a hand wheel and the like) is turned, the upper steering shaft 29 turns and the lower steering shaft 51, connected to the upper steering shaft 29 through universal joint 34, turns the pinion gear. Rotation of the pinion gear moves the rack, which moves tie rods 38 (only one shown) in turn moving the steering knuckles 39 (only one shown), which turn a steerable wheel(s) 44 (only one shown).

Electric power steering assist is provided through the control apparatus generally designated by reference numeral 24 and includes the controller 16 and an electric machine 19, which includes a permanent magnet synchronous motor, and is hereinafter denoted as motor 19. The controller 16 is powered by the vehicle power supply 10 through line 12. The controller 16 receives a vehicle speed signal 14 representative of the vehicle velocity from a vehicle velocity sensor 17. Steering angle is measured through position sensor 32, which may be an optical encoding type sensor, variable resistance type sensor, or any other suitable type of position sensor, and supplies to the controller 16 a position signal 20. Motor velocity may be measured with a tachometer, or any other device, and transmitted to controller 16 as a motor velocity signal 21. A motor velocity denoted $\omega_m$ may be measured, calculated or a combination thereof. For example, the motor velocity $\omega_m$ may be calculated as the change of the motor position θ as measured by a position sensor 32 over a prescribed time interval. For example, motor velocity $\omega_m$ may be determined as the derivative of the motor position θ from the equation $$\omega_m = \frac{\Delta \theta}{\Delta t}$$

where Δt is the sampling time and Δθ is the change in position during the sampling interval. Alternatively, motor velocity may be derived from motor position as the time rate of change of position. It will be appreciated that there are numerous well-known methodologies for performing the function of a derivative.

As the steering wheel 26 is turned, torque sensor 28 senses the torque applied to the steering wheel 26 by the vehicle operator. The torque sensor 28 may include a torsion bar (not shown) and a variable resistive-type sensor (also not shown), which outputs a variable torque signal 18 to controller 16 in relation to the amount of twist on the torsion bar. Although this is one type of torque sensor, any other suitable torque-sensing device used with known signal processing techniques will suffice. In response to the various inputs, the controller sends a command 22 to the electric motor 19, which supplies torque assist to the steering system through worm 47 and worm gear 48, providing torque assist to the vehicle steering.

It should be noted that although the disclosed embodiments are described by way of reference to motor control for electric steering applications, it will be appreciated that such references are illustrative only and the disclosed embodiments may be applied to any motor control application employing an electric motor, e.g., steering, valve control, and the like. Moreover, the references and descriptions herein may apply to many forms of parameter sensors, including, but not limited to torque, position, speed and the like. It should also be noted that reference herein to electric machines including, but not limited to, motors, hereafter, for brevity and simplicity, reference will be made to motors only without limitation.

In the control system 24 as depicted, the controller 16 utilizes the torque, position, and speed, and like, to compute a command(s) to deliver the required output power. Controller 16 is disposed in communication with the various systems and sensors of the motor control system. Controller 16 receives signals from each of the system sensors, quantifies the received information, and provides an output command signal(s) in response thereto, in this instance, for example, to the motor 19. Controller 16 is configured to develop the corresponding voltage(s) out of inverter (not shown), which may optionally be incorporated with controller 16 and will be referred to herein as controller 16, such that, when applied to the motor 19, the desired torque or position is generated. In one or more examples, the controller 24 operates in a feedback control mode, as a current regulator, to generate the command 22. Alternatively, in one or more examples, the controller 24 operates in a feedforward control mode to generate the command 22. Because these voltages are related to the position and speed of the motor 19 and the desired torque, the position and/or speed of the rotor and the torque applied by an operator are determined. A position encoder is connected to the steering shaft 51 to detect the angular position θ. The encoder may sense the rotary position based on optical detection, magnetic field variations, or other methodologies. Typical position sensors include potentiometers, resolvers, synchros, encoders, and the like, as well as combinations comprising at least one of the forgoing. The position encoder outputs a position signal 20 indicating the angular position of the steering shaft 51 and thereby, that of the motor 19.

Desired torque may be determined by one or more torque sensors 28 transmitting torque signals 18 indicative of an applied torque. One or more exemplary embodiments include such a torque sensor 28 and the torque signal(s) 18 therefrom, as may be responsive to a compliant torsion bar, T-bar, spring, or similar apparatus (not shown) configured to provide a response indicative of the torque applied.

In one or more examples, a temperature sensor(s) 23 located at the electric machine 19. Preferably, the temperature sensor 23 is configured to directly measure the temperature of the sensing portion of the motor 19. The temperature sensor 23 transmits a temperature signal 25 to the controller 16 to facilitate the processing prescribed herein and compensation. Typical temperature sensors include thermocouples, thermistors, thermostats, and the like, as well as combinations comprising at least one of the foregoing sensors, which when appropriately placed provide a calibratable signal proportional to the particular temperature.

The position signal 20, velocity signal 21, and a torque signal(s) 18 among others, are applied to the controller 16. The controller 16 processes all input signals to generate values corresponding to each of the signals resulting in a rotor position value, a motor velocity value, and a torque value being available for the processing in the algorithms as prescribed herein. Measurement signals, such as the above mentioned are also commonly linearized, compensated, and filtered as desired to enhance the characteristics or eliminate undesirable characteristics of the acquired signal. For example, the signals may be linearized to improve processing speed, or to address a large dynamic range of the signal. In addition, frequency or time based compensation and filtering may be employed to eliminate noise or avoid undesirable spectral characteristics.

In order to perform the prescribed functions and desired processing, as well as the computations therefore (e.g., the identification of motor parameters, control algorithm(s), and the like), controller 16 may include, but not be limited to, a processor(s), computer(s), DSP(s), memory, storage, register(s), timing, interrupt(s), communication interface(s), and input/output signal interfaces, and the like, as well as combinations comprising at least one of the foregoing. For example, controller 16 may include input signal processing and filtering to enable accurate sampling and conversion or acquisitions of such signals from communications interfaces. Additional features of controller 16 and certain processes therein are thoroughly discussed at a later point herein.

As mentioned earlier, estimation of machine parameters, such as the back-EMF constant and the motor circuit resistance, is critical for operation of the torque and current control of PMSMs. Parameter estimates are utilized for determining the optimal current commands given a torque command, a machine speed, and a DC link voltage. Further, in several cases, the current regulator gains are scheduled as a direct function of estimated machine parameters to obtain satisfactory dynamic response characteristics of the motor torque and current control system. Machine parameters are also used within the motor control system for several other functions including signal observers, stability enhancement functions etc. Machine parameters vary widely throughout the operating region of the PMSM drive system as well as over the life of EPS system. Thus, accurate estimation of machine parameters is critical to the optimal functioning of the PMSM drive system.

Typically, machine parameters are estimated utilizing a feedforward approach, which involves using a model of the parameter variation. Specifically, the machine back-EMF or torque constant, and the motor circuit resistance are estimated using temperature variation models with estimated temperatures of the magnet, the winding, and the inverter switches. A magnetic saturation model is further used for accounting for the change of strength of the magnet with load variations.

The technical solutions described herein provides techniques for online learning of the PMSM parameters during feedback current control operation, thus addressing the technical challenge of estimating the PMSM parameters during feedback control. In one or more examples, the technical solutions described herein estimate the PMSM parameters by using the final and estimated voltage command(s) as inputs to different learning algorithms to estimate the machine parameters, particularly the back-EMF constant and the motor circuit resistance.

Figure 2:
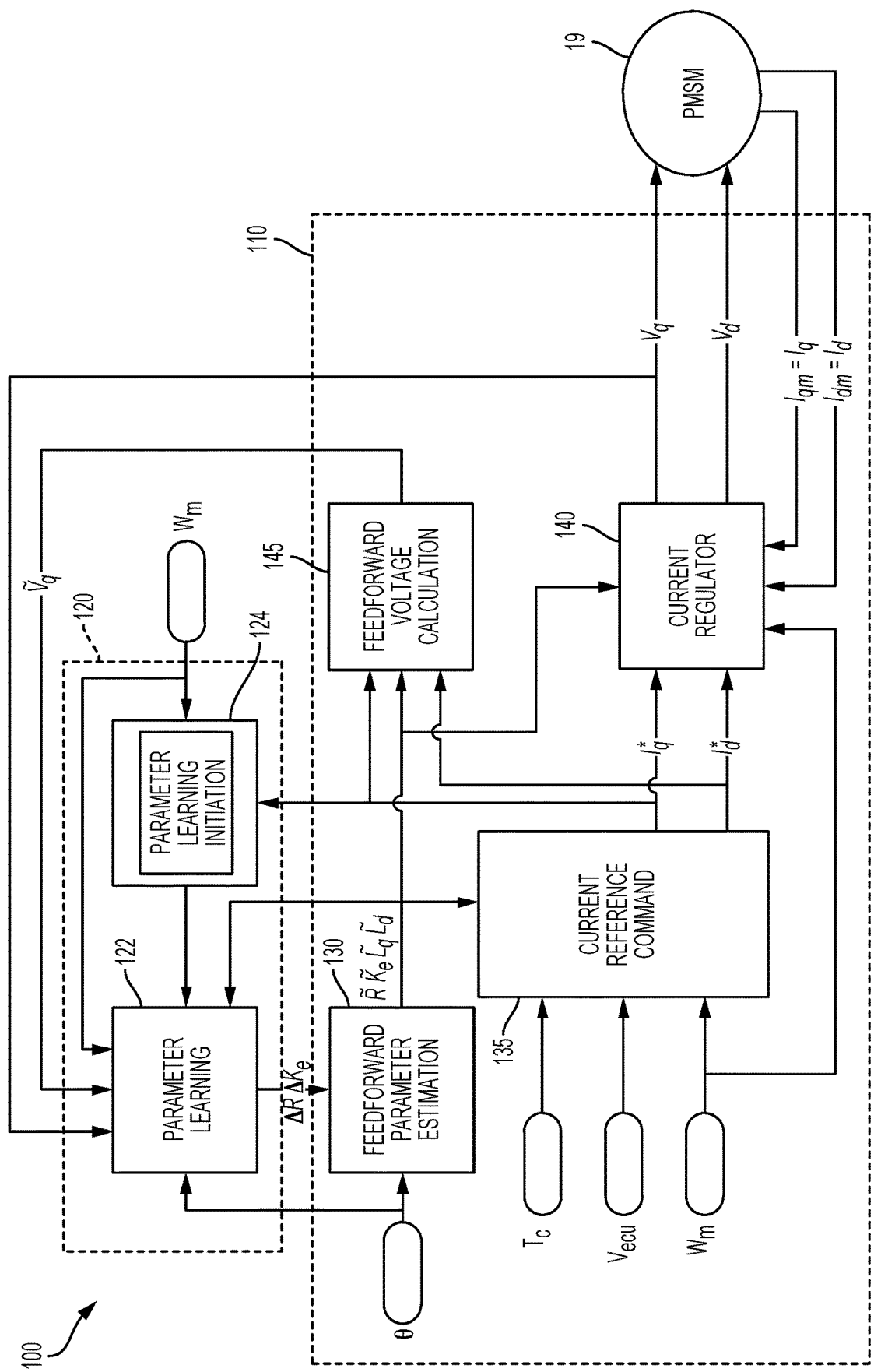
FIG. 2 depicts a block diagram of a motor control system with online parameter learning according to one or more embodiments.

FIG. 2 depicts a block diagram of a motor control system with online parameter learning according to one or more embodiments. The system 100 includes a torque control system 110 for the PMSM 19. The torque control system 110 can also be referred to as a current control system of the PMSM 19. The torque control system 110 receives motor parameter estimates from a parameter estimation system 120. The torque control system 110 further receives a desired output torque to be generated by the PMSM 19. The torque control system 110 may include a feedforward parameter estimator 130 that estimates one or more operating parameters, such as machine resistance ($\tilde{R}$), back-emf constant ($\tilde{K}_e$), machine inductance in the d-axis ($\tilde{L}_d$), and machine inductance in the q-axis ($\tilde{L}_q$). In one or more examples, the estimation may be based on a temperature ($\theta$) of the machine, the temperature being measured using a sensor or an estimated value. The torque control system 110 further includes a current reference generator 135 that determines current references that are sent as input to a current regulator 140. The current reference generator 135 computes motor current references ($I^*_q$, $I^*_d$) to produce the desired motor electrical torque, while meeting the voltage limit constraint. The motor current references are used by a voltage calculation module 145 to compute estimated voltage values ($\tilde{V}_q$ and $\tilde{V}_d$), which are forwarded to the parameter estimation system 120. In one or more examples, the computed voltage values are feedforward voltage command values.

The current reference generator 135 receives, as inputs the operating conditions including motor velocity ($\omega_m$), DC link voltage ($V_{ecu}$), and torque command ($T_c$), as well as the output of the feedforward parameter estimator 130. The feedforward parameter estimator approximates the machine parameters ($\tilde{K}_e$, $\tilde{R}$, $\tilde{L}_q$, $\tilde{L}_d$) utilizing a parameter variation model with temperature and magnetic saturation (including, in certain cases, a thermal model for predicting component temperatures) and pre-defined calibrations. The steady state machine equations below are utilized to determine the current references (commands) that are sent to the current regulator 140, where m is a feedforward estimate of the modulation index.

$$T_c = c\tilde{K}_e I^*_q + c_r N_p (\tilde{L}_q - \tilde{L}_d) I^*_q I^*_d \tag{1}$$

$$\tilde{V}_q = c\tilde{R}I^*_q - c\frac{N_p}{2}\omega_m \tilde{L}_d I^*_d + \tilde{K}_e \omega_m \tag{2}$$

$$\tilde{V}_d = c\tilde{R}I^*_d + c\frac{N_p}{2}\omega_m \tilde{L}_q I^*_q \tag{3}$$

$$m = \frac{\sqrt{\tilde{V}_q^2 + \tilde{V}_d^2}}{V_{ecu}} \leq 1 \tag{4}$$

$$\text{where } c = \frac{\sqrt{3}}{2} \text{ and } c_r = \frac{3}{8}$$

when the line to line description for the machine model is used. Note that the tilde in the above equations implies estimated machine parameters. Equation 1 is solved to determine the amount of current that is desired to achieve $T_c$. Equations 2-4 determine if the desired torque is achievable with the available voltage. If the desired torque command is not achievable, then the current reference command module 135 solves for reference currents such that the difference between $T_c$ and modified torque command is minimized Equations 1-4 represent the model of the machine when using estimated parameters, whereas equations 5-7 below are the actual machine characteristics (including dynamics), where $N_p$ is the number of magnetic poles of the PMSM motor 19.

$$T_e = cK_e I_q + c_r N_p (L_d - L_q) I_q I_d \tag{5}$$

$$V_q = cL_q \dot{I}_q + cRI_q - c\frac{N_p}{2}L_d I_d \omega_m + K_e \omega_m \tag{6}$$

$$V_d = cL_d \dot{I}_d + cRI_d + c\frac{N_p}{2}L_q I_q \omega_m \tag{7}$$

where $T_e$ is the actual electromagnetic torque, $I_d$ and $I_q$ are the actual machine currents, and $K_e$, R, $L_d$, $L_q$ are the actual machine parameters. According to one or more embodiments described herein, the estimated machine inductances are assumed to be accurate, and the online determination or learning of motor circuit resistance and back-EMF voltage (or torque) constant is performed using the estimated machine inductance. During steady state and low frequency transient behavior (where the derivatives of both current are approximately zero, i.e., $\dot{I}_q \cong 0$, $\dot{I}_d \cong 0$), it can be assumed that $I_d = I^*_q$, $I_d = I^*_d$ due to the presence of the high bandwidth feedback current regulator 140. The current regulator 140 is a multiple input multiple output PI-based control scheme that ensures that reference currents are tracked, and in one or more examples, the reference currents are substantially equal to the actual measurements. The relationship between the actual and commanded electromagnetic torque with real and estimated machine parameters is shown in equation 8 below.

$$\frac{T_e}{T_c} = \frac{cK_e + c_r N_p (L_q - L_d) I_d}{c\tilde{K}_e + c_r N_p (\tilde{L}_q - \tilde{L}_d) I_d} \quad (8)$$

Using the equations 6-7 and the equations. 2-3 the relationship between estimates and actual parameters in terms of the final and feedforward q-axis voltage commands can be expressed as follows.

$$V_q = \tilde{V}_q \left( \frac{R}{\tilde{R}} - \frac{\frac{N_p^2}{4} \omega_m^2 \left( \frac{R}{\tilde{R}} \tilde{L}_d - L_d \right) \tilde{L}_q}{\tilde{R}^2 + \frac{N_p^2}{4} \tilde{L}_q \tilde{L}_d \omega_m^2} \right) - \quad (9)$$

$$\omega_m \left( \frac{R}{\tilde{R}} \tilde{K}_e - K_e \right) + \frac{\frac{N_p}{2} \omega_m \left( \frac{R}{\tilde{R}} \tilde{L}_d - L_d \right) \left( \tilde{R} \tilde{V}_d + \frac{N_p}{2} \tilde{L}_q \tilde{K}_e \omega_m^2 \right)}{\tilde{R}^2 + \frac{N_p^2}{4} \tilde{L}_q \tilde{L}_d \omega_m^2}$$

Considering the assumptions stated above, and based on the equation 9, the resistance estimation error has a linear relationship to the error observed in the q-axis voltage. The same can be said for back-EMF voltage (or torque) constant error. The proposed invention converges to accurate estimate parameters through either an open loop or closed loop learning scheme by using the error in the voltages.

The open loop learning scheme is a calculation based approach to account for inaccuracies in feedforward parameter estimates. Equation 9 simplified with the assumption made about inductance estimates is shown below:

$$V_q = \tilde{V}_q \frac{R}{\tilde{R}} - \omega_m \left( \frac{R}{\tilde{R}} \tilde{K}_e - K_e \right) \quad (10)$$

Based on the equation 10, it can be determined when the motor parameter estimates are independent of each other. For example, when the motor 19 is near stall condition $\omega_m \cong 0$ the equation below holds true.

$$R = \frac{V_q}{\tilde{V}_q} \tilde{R} \quad (11)$$

Equation 10 above can rearranged to be written as:

$$K_e = \frac{R(\tilde{K}_e \omega_m - \tilde{V}_q) + V_q \tilde{R}}{\omega_m \tilde{R}} \quad (12)$$

When the current flowing through the motor is sufficiently low, i.e., $I_{qm} \cong 0$ then $(\tilde{K}_e \omega_m - \tilde{V}_q) \cong 0$, which leads to the equation below.

$$K_e = \frac{V_q}{\omega_m} \quad (13)$$

Referring to FIG. 2, the parameter estimation system 120 includes a parameter learning module 122 according to one or more embodiments. In one or more examples, the parameter learning module 122 uses the parameter learning described herein and converges to an accurate feedforward parameter estimate based on equation 11 and equation 13. It should be noted that the parameter learning module 122 can be used in different examples such as in an embodiment that performs parameter learning in an open loop manner. The feedforward parameter estimator 130 uses the learned parameter values ΔR and ΔK$_e$ to obtain the final parameter estimates. The parameter estimation system 120 further includes a parameter learning region determination module 124, which determines when to learn each parameter based on the condition used to derive both equation 11 & equation 13. In the embodiments described herein the parameter learning region determination module 124 uses commanded or reference current values, however it should be noted that in other embodiments actual motor current measurements can be used.

Figure 3:
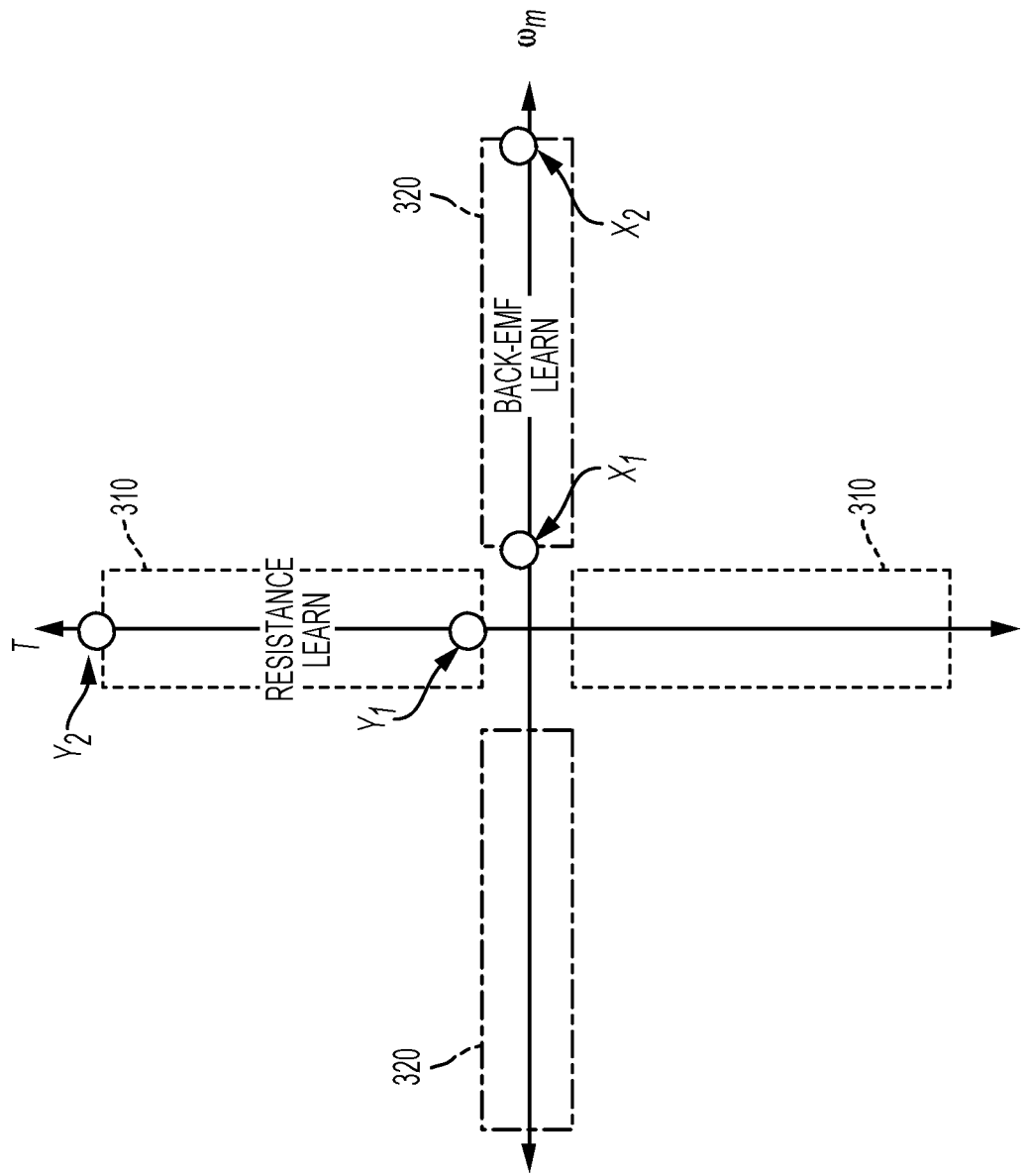
FIG. 3 provides a visual representation in the torque speed plane of the region for learning parameters.

FIG. 3 provides a visual representation in the torque speed plane of the region for learning parameters. Regions 310 represent the condition when $\omega_m \cong 0$, and can be used for learning the machine resistance using the equation 11. Regions 320 represent the condition when the torque command is small, and thus $I_{qm} \cong 0$, $(\tilde{K}_e \omega_m - \tilde{V}_q) \cong 0$, and can be used for learning the back-EMF constant using the equation 13. Note that instead of using the torque speed plane, a current speed plane may also be used. In that case, the region of convergence would be determined based on one or more of the current values (which may be either commanded or measured currents) in the q-axis and/or d-axis.

Figure 4B:
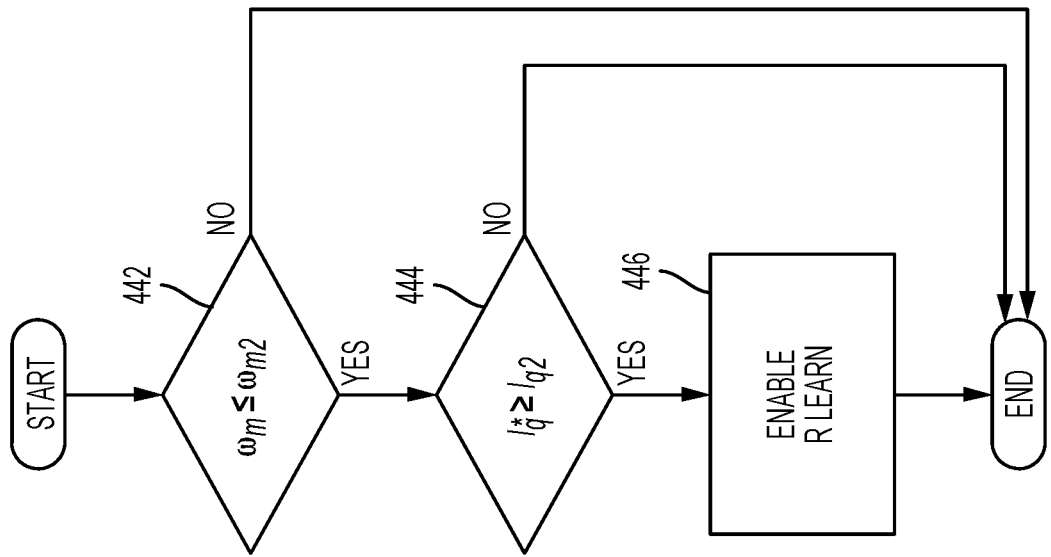
FIG. 4A and FIG. 4B depict a flowchart for example methods to determine regions to learn/estimate the machine parameters according to one or more embodiments.
Figure 4A:
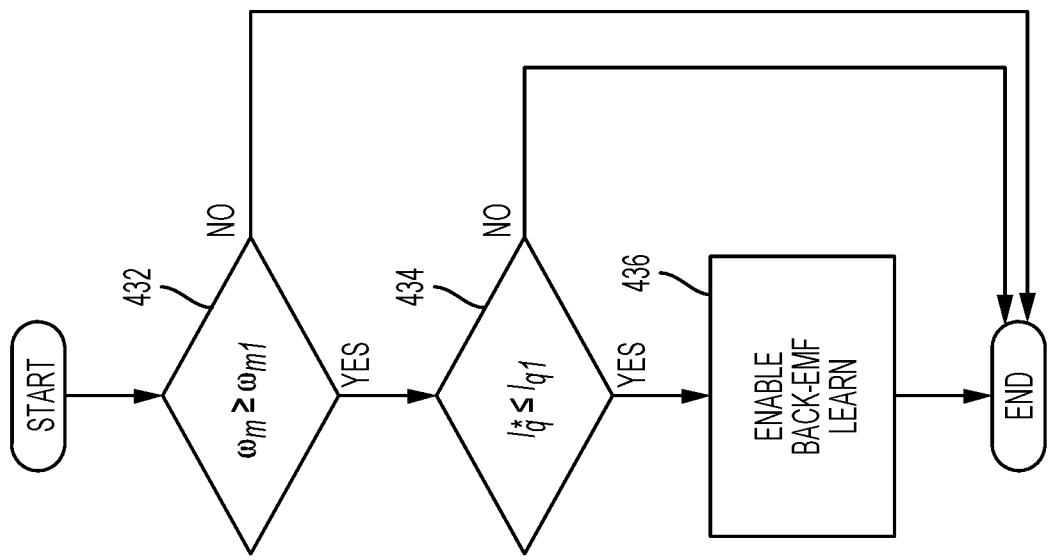

FIGS. 4A and 4B depict flowcharts for example methods to determine regions to learn/estimate the machine parameters according to one or more embodiments. The methods can be implemented or executed by the parameter learning initiation module 124. In one or more examples, the methods may be executed by the control module 26 as a result of executing computer executable instructions that are stored on a computer storage device.

The methods facilitate determining regions of convergence for parameter learning. It should be noted that while some specific embodiments of the learning regions are described herein, in other examples, the method can be extended to make the learning algorithms more robust to operating conditions. For instance, the rate of change of variables such as speed or current may be used to determine rapidly changing operating conditions, in which the learning could be disabled.

As depicted in FIG. 4A, the method includes determining whether to learn back-EMF ($K_e$) machine parameter based on an absolute value of the motor velocity ($\omega_m$), and an absolute value of the reference current in the q-axis ($I^*_q$). If the motor velocity is greater than (or equal to) a first predetermined threshold $\omega_{m1}$ (which is based on $x_1$ in FIG. 3) and if the reference q-axis current is less than (or equal to) a second predetermined threshold $I_{q1}$ (based on $y_1$ in FIG. 3), the method initiates learning for the back-EMF ($K_e$) machine parameter, at 432, 434, and 436. If either of the conditions are not met, the back-EMF learning is not initiated.

Further, as depicted in FIG. 4B, the method includes determining whether to learn the machine circuit resistance (R) machine parameter based on the absolute values of the motor velocity ($\omega_m$), and the reference q-axis current ($I^*_q$). If the motor velocity is less than (or equal to) a third predetermined threshold $\omega_{m2}$ (based on $x_2$ in FIG. 3) and if the reference q-axis current is greater than (or equal to) a fourth predetermined threshold $I_{q2}$ (based on $y_2$ in FIG. 3), the method initiates learning for the resistance (R) parameter, at 442, 444, and 446. If the condition(s) are not met, the resistance learning is not initiated.

In one or more examples, the parameter learning initiation module 124 provides two flags, one that indicates whether to enable the back-EMF constant learning, and a second that indicates whether to enable the resistance learning. The values of the flags are set according to the method described above, the flags being set to TRUE at 436 and 446, and being set to FALSE otherwise. In other examples, the parameter learning initiation is indicated in any other manner, such as sending a control signal etc.

The flags are provided to the parameter learning module 122, which estimates the machine parameter values based on the corresponding flag status.

Figure 5:
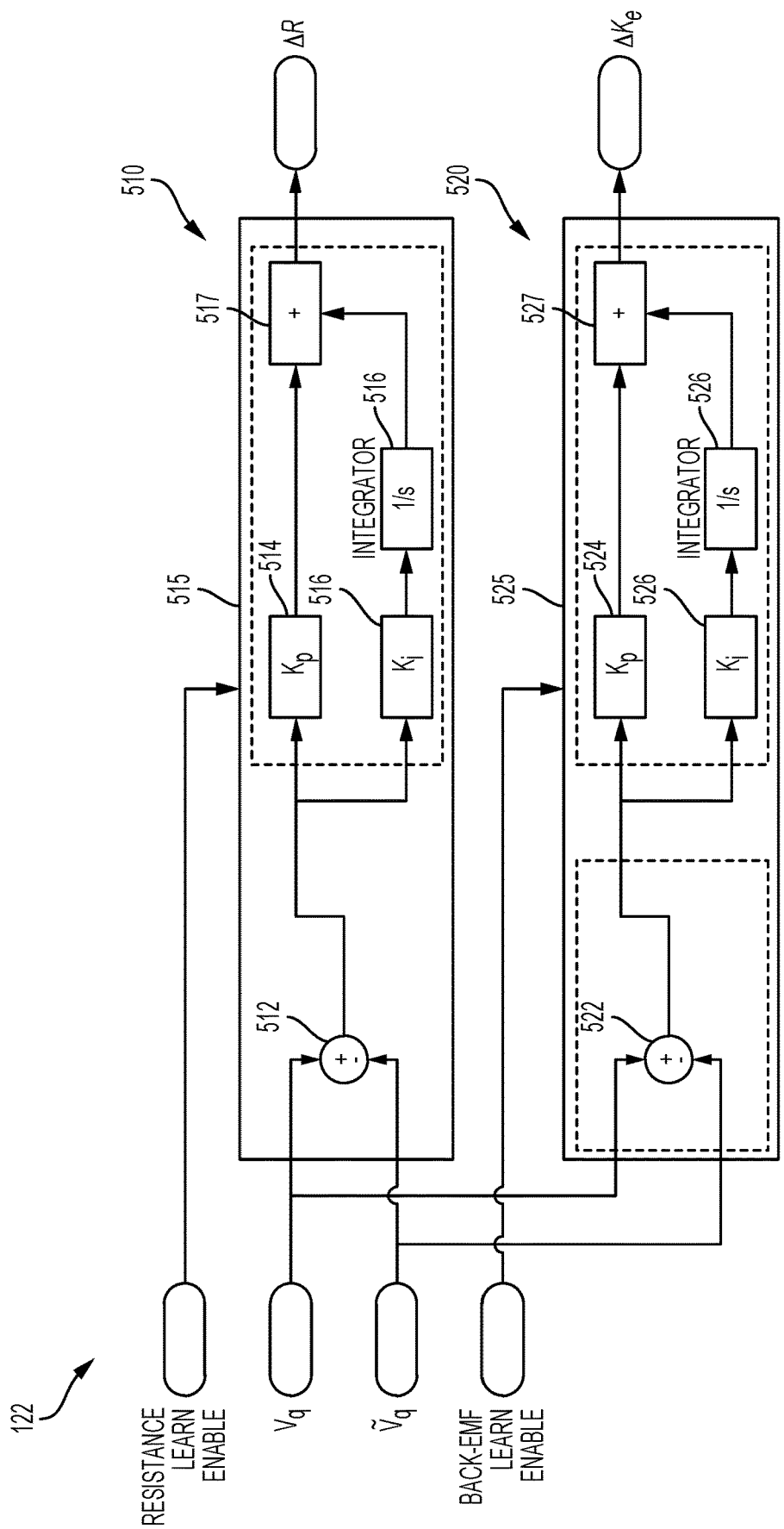
FIG. 5 depicts a block diagram of a parameter learning module according to one or more embodiments.

FIG. 5 depicts a block diagram of a parameter learning module according to one or more embodiments. FIG. 5 also depicts an operational flow for a method to learn the parameter values according to one or more embodiments. The method may be implemented or executed by the parameter learning module 122. In one or more examples, the method may be executed as a result of executing computer executable instructions that are stored on a computer storage device.

The parameter learning module 122 includes a resistance learning module 510 and a back-emf learning module 520. It should be noted that in other examples, the parameter learning module 122 can include other components, or different components than those described herein for performing the closed loop parameter learning.

The closed loop parameter learning technique utilizes identical region of convergence as mentioned for open loop strategy. The difference is that a regulator is used to obtain the machine parameter estimation errors. The parameter learning module 122 in the closed loop approach applies a regulator (including an integrator) on the difference between q-axis voltage feedforward estimate ($\tilde{V}_q$) and actual q-axis voltage ($V_q$). This guarantees convergence of estimated machine parameters to the real parameters.

For example, the resistance learning module 510 receives the values of q-axis voltage ($V_q$) and the estimated q-axis voltage ($\tilde{V}_q$) and computes a difference between the two at 512. The difference indicates an error in q-axis voltage, which is then fed to and processed by a PI controller 515 to compute an error in machine resistance value ($\Delta R$), which is be used to update/learn/estimate the machine resistance ($\tilde{R}$). In one or more examples, the PI controller 515 scales the computed difference using a first scaling factor ($K_p$), which may be a gain factor of the PI controller 515, at 514. Concurrently, the difference is scaled using another scaling factor ($K_i$), which may be a tuning factor of the PI controller 515, at 516. The scaled difference values are summed, at 517 and the sum is output as the error in machine resistance value ($\Delta R$).

It should be noted that the error in machine circuit resistance value ($\Delta R$) is computed only if the resistance learning is enabled, as indicated by the corresponding flag from the parameter learning enable module 124.

In a similar manner, the back-EMF learning module 520 computes the error in back-EMF if the back-EMF learning is enabled, as indicated by the corresponding flag from the parameter learning enable module 124.

The back-EMF learning module 520 receives the values of q-axis voltage ($V_q$) and the estimated q-axis voltage ($\tilde{V}_q$) and computes a difference between the two at 522. The difference indicates an error in q-axis voltage, which is then processed by a PI controller 525 to compute an error in back-EMF value ($\Delta K_e$), which is used to learn and update the estimated back-EMF value ($\tilde{K}_e$). In one or more examples, the PI controller 525 scales the computed difference using a first scaling factor ($K_p$), which may be a gain factor of the PI controller 525, at 524. Concurrently, the difference is scaled using another scaling factor ($K_i$), which may be a tuning factor of the PI controller 525, at 526. The scaled difference values are summed, at 527 and the sum is output as the error in back-EMF value ($\Delta K_e$).

The resistance learning module 510 and the back-EMF learning module 520, both use closed loop operation to drive the corresponding errors ($\Delta R$ and $\Delta Ke$) to substantially zero. The computed error values are further combined with the feedforward estimates that may be computed, for example using a temperature based model, a magnetic model, or any other technique.

Figure 6:
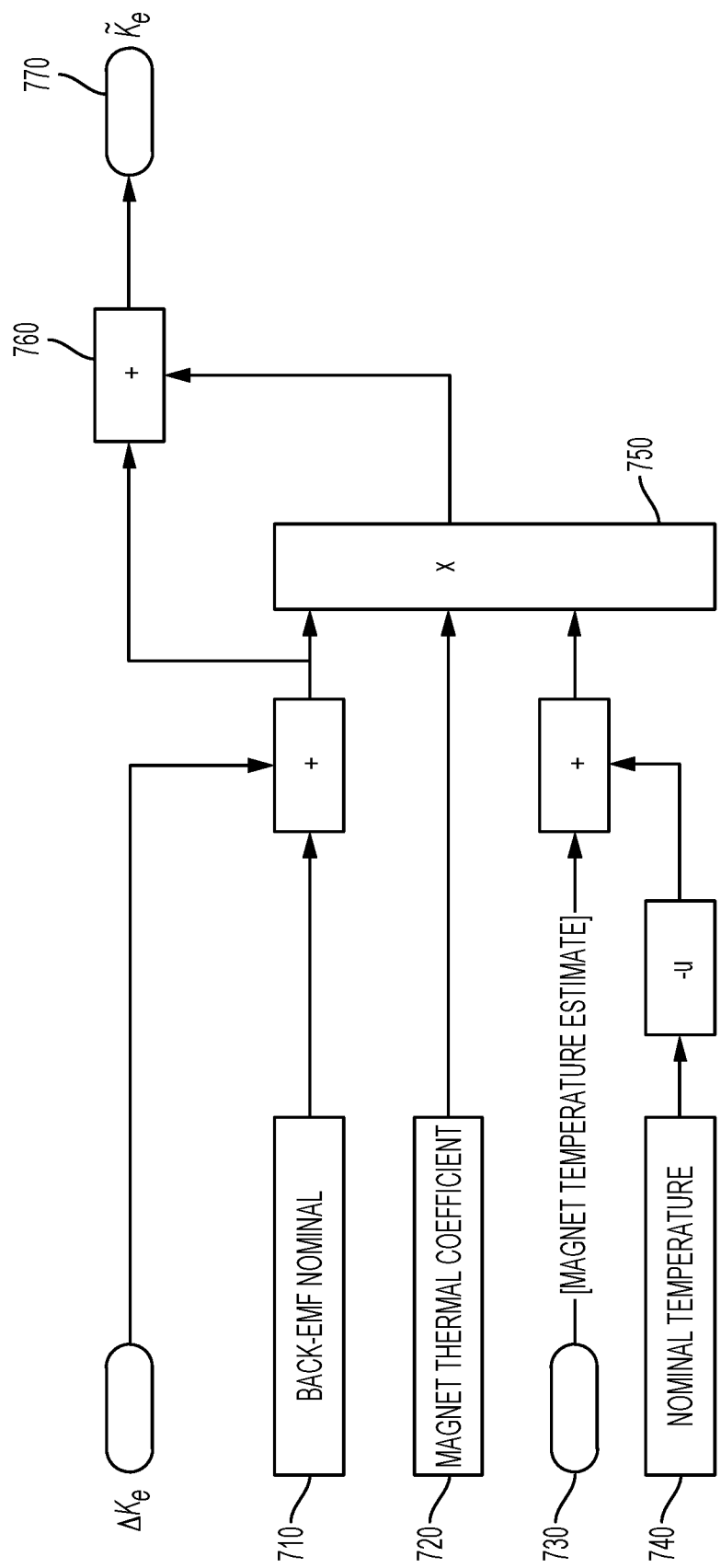
FIG. 6 depicts a block diagram of an operational flow of estimating or learning a machine parameter according to one or more embodiments.

FIG. 6 depicts a block diagram of an operational flow of estimating or learning a machine parameter according to one or more embodiments. The closed loop estimation of an error in the machine parameter is used to compute the machine parameter value. In the depicted example, the machine parameter computed is the back-EMF constant ($\tilde{K}_e$) based on the error in estimated back-EMF constant ($\Delta K_e$). It is understood that a similar configuration can be used for any other machine parameter that is to be computed, such as the estimated motor circuit resistance ($\tilde{R}$).

The error in estimated back-EMF constant is computed as described herein (for example, FIG. 5). Computing the machine parameter includes using nominal values, such as a nominal back-EMF constant 710 and thermal coefficient 720, among others, along with temperature estimate 730, among others. Note that the thermal coefficient is a thermal coefficient of the thermally sensitive material of the parameter being calculated (such as the temperature coefficient of resistivity of copper for the motor resistance). A difference in a nominal temperature 740 and the temperature estimate 730, the thermal coefficient 720, and a sum of the nominal back-EMF value 710 and the error in estimated back-EMF constant, are multiplied at 750. The nominal temperature 740 is the temperature at which the value of the magnet thermal coefficient 720 is determined. The result of the multiplication is added with the sum of the nominal back-EMF constant value 710 and the estimation error at 760, the addition being output as the back-EMF constant, at 770.

A similar configuration and structure can be used for computing the motor circuit resistance (R), and the structure not repeated herein.

The technical solutions described herein, thus facilitates computing a final machine resistance estimated using the one or more embodiments described herein coupled with existing feedforward parameter estimation.

The technical solutions described herein facilitate closed and open loop parameter learning techniques, both of which address the technical challenge of parameter variation from part to part and over time. Some other advantages that are provided by the technical solutions described herein include reducing motor control development time for utilization in vehicle, cost saving on part specific bar code labels and manufacturing end of line time and tooling. As described herein the estimation of machine parameters is critical for operation of the torque and current control of PMSMs, particularly in case of a steering system.

While one or more embodiments of the invention have been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

What is claimed is:

1. A method for estimating machine parameters of a permanent magnet synchronous motor (PMSM) drive, the method comprising:
   determining a region for estimating a machine parameter based on a motor velocity value and a motor current value, wherein the machine parameter is a circuit resistance of the PMSM drive; and
   in response to the motor velocity value and the motor current value being in the region:
      estimating an error in estimated voltage command; and
      estimating the machine parameter using the error in estimated voltage command.

2. The method of claim 1, wherein estimating the machine parameter using the error in the estimated voltage command comprises using a closed loop calculation.

3. The method of claim 2, wherein the closed loop calculation computes an error in the machine parameter, and the error in machine parameter is combined with the machine parameter that is estimated using a temperature model.

4. The method of claim 1, wherein estimating the machine parameter using the error in the estimated voltage command comprises using an open loop calculation.

5. The method of claim 1, wherein the region for estimating the resistance is when the motor velocity value is less than or equal to a first threshold value and when the motor current value is greater than or equal to a second threshold value.

6. A system comprising:
   a motor;
   a motor control system operating the motor using feedback control; and
   a machine parameter learning system configured to estimate a machine parameter of the motor control system, the estimation of the machine parameter comprising:
      determining a region for estimating a machine parameter based on a motor velocity value and a motor current value, wherein the machine parameter is a back-EMF; and
      in response to the motor velocity value and the motor current value being in the region:
         estimating an error in estimated voltage command; and
         estimating the machine parameter using the error in the estimated voltage command.

7. The system of claim 6, wherein the region for estimating the back-EMF is when the motor velocity value is greater than or equal to a first threshold value and when the motor current value is less than or equal to a second threshold value.

8. The system of claim 6, wherein estimating the machine parameter using the error in the estimated voltage command comprises using one of a closed loop calculation and an open loop calculation.

9. A steering system comprising:
   a permanent magnet synchronous motor (PMSM) drive;
   a current command generator that generates a motor current command for the PMSM drive corresponding to an input torque command; and
   a parameter learning system configured to estimate a machine parameter of the PMSM drive, the estimation of the machine parameter comprising:
      determining a region for estimating a machine parameter based on a motor velocity value and a motor current value, wherein the machine parameter is a resistance; and
      in response to the motor velocity value and the motor current value being in the region:
         estimating an error in estimated voltage command; and
         estimating the machine parameter using the error in the estimated voltage command.

10. The steering system of claim 9, wherein the region for estimating the resistance is when the motor velocity value is less than or equal to a first threshold value and when the motor current value is greater than or equal to a second threshold value.

11. The steering system of claim 9, wherein estimating the machine parameter using the error in the estimated voltage command comprises using one of a closed loop calculation and an open loop calculation.

* * * * *